United States Patent
Heo (10) Patent No.: US 9,274,899 B2
(45) Date of Patent: Mar. 1, 2016

(54) PROVIDING NON-VOLATILE MEMORY FOR SUSPEND-TO-RANDOM ACCESS MEMORY

(71) Applicant: Red Hat, Inc., Raleigh, NC (US)

(72) Inventor: Taejun Heo, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 13/939,560

(22) Filed: Jul. 11, 2013

(65) Prior Publication Data

US 2015/0019908 A1 Jan. 15, 2015

(51) Int. Cl.
*G06F 11/00* (2006.01)
*G06F 11/14* (2006.01)

(52) U.S. Cl.
CPC ........ *G06F 11/1458* (2013.01); *G06F 11/1441* (2013.01)

(58) Field of Classification Search
CPC ............ G06F 11/1448; G06F 11/1451; G06F 11/1456; G06F 11/1458; G06F 11/1469; G06F 11/1471; G06F 11/1402; G06F 11/1412; G06F 11/1415; G06F 11/1417; G06F 11/1433; G06F 11/1435; G06F 11/1438; G06F 11/1441
See application file for complete search history.

(56) References Cited

U.S. PATENT DOCUMENTS

| | | | |
|---|---|---|---|
| 5,410,713 A * | 4/1995 | White et al. | 713/330 |
| 7,103,718 B2 | 9/2006 | Nickel et al. | |
| 7,971,014 B2 | 6/2011 | Yoshii et al. | |
| 8,977,590 B2 * | 3/2015 | Habermann et al. | 707/609 |
| 2003/0182590 A1 * | 9/2003 | Neuman et al. | 713/300 |
| 2003/0217299 A1 * | 11/2003 | Neuman et al. | 713/300 |
| 2006/0136765 A1 * | 6/2006 | Poisner et al. | 713/323 |
| 2008/0140959 A1 * | 6/2008 | Popell et al. | 711/161 |
| 2009/0313416 A1 | 12/2009 | Nation | |
| 2011/0099325 A1 | 4/2011 | Roh et al. | |
| 2011/0208900 A1 | 8/2011 | Schuette et al. | |
| 2012/0246390 A1 | 9/2012 | Kanai et al. | |
| 2012/0331236 A1 | 12/2012 | Kikuta et al. | |
| 2014/0089264 A1 * | 3/2014 | Talagala et al. | 707/649 |

* cited by examiner

*Primary Examiner* — Joseph Kudirka
(74) *Attorney, Agent, or Firm* — Lowenstein Sandler LLP (57) ABSTRACT

A mechanism for providing non-volatile memory for suspend-to-RAM in a computer system. A method includes searching for a checkpoint message in a memory upon receipt of notification of restoring of power in a system. The checkpoint message is a confirmation of storing of state of a storage device prior to loss of the power in the system. The method also includes determining whether the checkpoint message indicates that the system reached the power integrity checkpoint. The power integrity checkpoint is a confirmation of the storing of the state of other device prior to the loss of the power in the system. The other device is different from the storage device. The method further includes restoring operating conditions of the system when it is determined that the system has reached the power integrity checkpoint.

18 Claims, 4 Drawing Sheets

PROVIDING NON-VOLATILE MEMORY FOR SUSPEND-TO-RANDOM ACCESS MEMORY

TECHNICAL FIELD

The implementations of the disclosure relate generally to a computer system and, more specifically, relate to providing non-volatile memory for suspend-to-random access memory (RAM) in a computer system.

BACKGROUND

The most widely-used form of primary storage for computer memory is a volatile form of random access memory (RAM). With volatile RAM, a loss of power causes the computer to shut down and stop operating resulting in any run time states stored in the RAM, which hasn't been written out to the disk to be lost. Also, the system has to be fully reinitialized when the power is restored. Run time states include information on system configuration, open applications, and active files, which are stored in main memory (RAM), while most of the system's other components are turned off.

Existing systems are instructed to enter suspend-to ram (STR) mode. STR mode occurs when a system enters a low power state. The system is instructed via many ways such as a timer, a lid close of a laptop, hardware button, keyboard press or another explicit user command. The system may resume operation upon events such as a lid open of the laptop, hardware button, timer, keyboard press or another explicit user command. Currently, with many OSs, the time it takes to reach STR mode often reaches multitudes of seconds and even longer depending on the state of the computer system, such as unwritten data stored in the memory. Furthermore, operations involved in reaching the STR mode may be prone to failure, for example due to failure of memory allocation and, more commonly, due to failure to suspend peripheral devices.

BRIEF DESCRIPTION OF THE DRAWINGS

The disclosure is understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure are directed to providing non-volatile memory for suspend-to-RAM on occurrence of power loss in a computer system. A suspend-to-RAM may occur when the computer system loses power.

In one implementation, a power-loss and power-restoration (PLPR) module executed by the computer system stores a checkpoint message in a main memory of the computer system. The checkpoint message may indicate that the computer system has reached a storage integrity checkpoint prior to the power loss. The storage integrity checkpoint may include events such as, but not limited to, completion of notification of power failure to operating system (OS), stop issuance of new input/output (IO) commands, abort the IO commands currently being processed in the system, and store various states of the storage devices in the system.

In another implementation, the PLPR module stores a power loss handling completion message in the main memory of the computer system. The power loss handling completion message may indicate that the computer system has reached a power integrity checkpoint prior to the power loss. The power integrity checkpoint may include events such as, but not limited to, completion of the storage integrity checkpoint and storage of the various states of other devices in the system. In one implementation, the other devices are different from the storage devices.

A method of one implementation of the disclosure includes searching for a checkpoint message in a memory upon receipt of notification of restoring of power in a system. The checkpoint message is a confirmation of a storing state of all storage devices with unwritten data prior to loss of the power in the system. The method also includes determining whether the checkpoint message indicates that the system reached the power integrity checkpoint. The power integrity checkpoint is a confirmation of storing of state of other device prior to the loss of the power in the system. The other device is different from the storage device. The method further includes restoring operating conditions of the system when it is determined that the system has reached the power integrity checkpoint.

Existing solutions for suspend-to-RAM have several disadvantages for providing non-volatile memory for STR on power loss. For example, the time it takes to reach a suspend-to-RAM state may be multitudes of seconds or longer, depending on the state of the computer system. Also, the operations involved in reaching a suspend-to-RAM state may be prone to failure due to memory allocation and failure due to suspension of the peripheral devices. Implementations of the disclosure overcome these disadvantages by allocating resources of the system used for the suspend-to-RAM state during system initialization and suspending storage devices prior to suspending other devices upon power restoration. Implementations of the disclosure also shorten the time necessary to reach the suspend-to-RAM state by aborting in-flight Input/Output (IO) commands rather than waiting for them to complete, which can shorten the time to reach storage-integrity state depending on the amount of IOs in flight and the type of storage devices in use.

Figure 1:
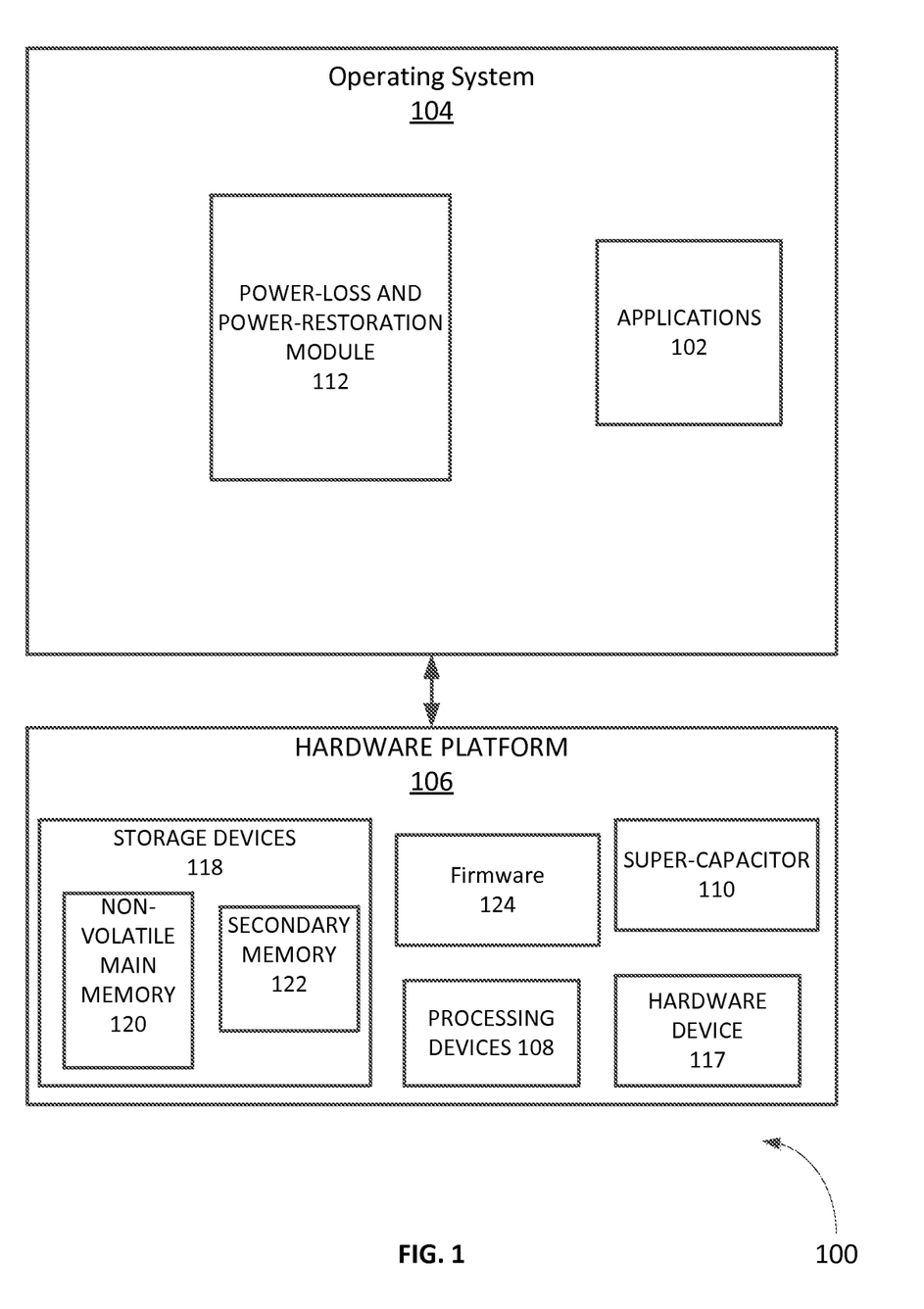
FIG. 1 is a block diagram of a computer system in which the implementations of the present disclosure may operate.

FIG. 1 is a block diagram illustrating a computer system ("system") 100 in which implementations of the disclosure may operate. In one implementation, the computer system 100 may be a machine such as, for example, any variety of end user devices. The end user devices may include, but are not limited to, a personal computer (PC), a laptop, a mobile phone, mobile smart phone, a tablet computer, handheld devices, netbooks, or any other computing device. Furthermore, computer system 100 may comprise a server device. The computer system 100 comprises a hardware platform 106, on top of which runs an operating system (OS) 104. The OS 104 may include Microsoft™, Linux™, Solaris™, Mac™ OS or any other suitable OS for managing operations on the computer system 100.

The hardware platform 106 may include one or more processing devices 108 and storage devices 118. In one implementation, the storage device 118 is a non-volatile storage memory and comprises one or more hardware or software devices, which may be located internally or externally to the computer system 100. The storage device 118 includes a non-volatile main memory 120 and a secondary main memory 122, which is already non-volatile in existing systems. Examples of non-volatile main memory include, but are not limited to, nvSRAM (non-volatileSRAM), FeRAM (ferroelectric RAM), MRAM (magnetoresistive RAM) and PCM (phase-change memory). The hardware platform 106 may also include a super-capacitor 110 to sustain the computer system 100 for a short period of time after power loss. As such, the super-capacitor 110 sustains the system so that the system has time to enter defined states in order to recover after power loss. In addition, hardware platform 106 may include additional hardware devices 117, such as network interface cards (NICs), sound or video adaptors, photo/video cameras, printer devices, keyboards, displays or any other suitable device intended to be coupled to a computer system. Furthermore, the hardware platform 106 may include a firmware 124 to notify the OS 104 of the power loss of the system. The firmware 124 may also resumes execution of the system as instructed by the OS 104 after the power is restored.

The OS 104 may utilize resource of hardware platform 106 to execute one or more software application programs 102 (i.e. applications). The applications 102 may be any computer-executable program capable of communicating with the OS 104. Some of these applications may include, but are not limited to, Microsoft™ applications, browser applications, an Eclipse integrated development environment (IDE), and/or other applications.

The OS 104 further includes a power-loss and power-restoration (PLPR) module 112 to provide non-volatile memory for suspend-to-RAM on power loss of the system 100. In some implementations, the PLPR module 112 pre-allocates resources in the system 100 for storing state of the system used to restore the system, after power failure in the system, to a set of conditions that existed prior to the power failure. In one implementation, the resources in the system 100 are part of the main memory 120 in the system 100. In one implementation, the resources are pre-allocated for each device while the device is being initialized during system boot. In other implementations, the resources are pre-allocated for each device while the device is being initialized, which occurs after the device has been connected to the computer system.

As part of its operations, system 100 may experience a power failure (e.g., power loss). In some implementations, the notification message to OS 104 receives a notification message, which indicates the occurrence of the power failure in the system 100. The notification message may be sent by the firmware 122 in the hardware platform 106 In some implementations, upon receipt of the notification message, the PLPR module 112 stops issuance of new input and/or output (IO) commands. In other implementations, upon receipt of the notification message, the PLPR module 112 aborts the IO commands that are currently being processed by the storage devices. In some implementations, upon receipt of the notification message, the PLPR module 112 stores various states of the storage devices 118 in the system 100 in order to restore the operating conditions of the storage devices 118. Such states include but not limited to device state, peripheral state, controller state and states of the buses (interconnects), which connects the controller to the computer system.

In one implementation, the PLPR module 112 may also store a checkpoint message, which indicates that the system 100 has reached a storage integrity checkpoint. In one implementation, the storage integrity checkpoint is a confirmation that the PLPR module 112 has reached an initial stage of handling the power loss. The initial stage may include stopping the issuance of new IOs and aborting the currently processing IOs, and storing the various states of the system 100 associated with the storage devices 118. In one implementation, the PLPR module 112 stores the checkpoint message in a first pre-defined position in the main memory of the storage device 118.

In some implementations, the PLPR module 112 stores the states of the other devices in the system 100 in order to restore operating conditions of the other devices after the power is restored. The states of the other devices may be stored after the previous storage integrity checkpoint is complete. The other devices are not the storage devices, and may include devices such as input devices, output devices, processing devices, network interface devices, signal generation devices, cursor control devices and video display. Such states include but not limited to, device state, peripheral state, controller state and states of the buses (interconnects), which connects the controller to the computer system.

In some implementations, the PLPR module 112 pre-allocates resources in the system 100 for storing state of the system used to restore the system, after power failure in the system, to a set of conditions that existed prior to the power failure. In one implementation, the resources in the system 100 are internal components of the system 100, such as storage devices 118 and other devices. The other devices are not storage devices. In one implementation, the other devices may include hardware devices and/or software devices. Some examples of the other devices may include, but are not limited to, input devices, output devices, processing devices, network interface devices, signal generation devices, cursor control devices and video display. In one implementation, the resources are pre-allocated for each device while the device is being initialized during system boot. In other implementations, the resources are pre-allocated for each device while the device is being initialized, which occurs after the device has been connected to the computer system.

In other implementations, the PLPR module 112 stores a power integrity checkpoint. In one implementation, the power integrity check point is a confirmation that the PLPR module 112 has reached the completion stage of the handling of power loss. The completion stage may include completion of the initial stage and completion of the storage of the states of the other devices. In one implementation, the PLPR module 112 stores the power integrity checkpoint in a second pre-defined position in the main memory of the storage device 118. In another implementation, the PLPR module 112 stores the power integrity checkpoint in the first pre-defined position.

In some implementations, the PLPR module 112 prepares the OS 104 to resume execution after power is restored in the system 100. The PLPR module 112 may send instructions to the firmware 124 to resume execution of the system from a pre-defined point specified by the OS 104 when power is restored. The pre-defined point specified by the OS 104 may be a resume point, which would be the same point once the storage integrity checkpoint has been reached during power failure. The OS 104 will resume from the pre-defined point and then check whether the storage integrity checkpoint or power integrity checkpoint is stored in the first pre-defined position or the second pre-defined position respectively.

In some implementations, when resuming execution of the system 100, the PLPR module 112 searches in the main memory for the checkpoint message. The PLPR module 112 clears the checkpoint message in the memory. As an example, the storage integrity checkpoint message is stored as an integer value such that value 0 means "clear" and value 1 means storage-integrity checkpoint has been reached. As such, the storage integrity checkpoint message is cleared when the PLPR module sets the integer value to 0.

Furthermore, when resuming execution of the system 100, the PLPR module 112 determines whether the checkpoint message indicates that the system 100 reached the power integrity checkpoint before losing power. In one implementation, if it is determined that the checkpoint message indicates that the system reached the power integrity checkpoint, then the PLPR module 112 restores operating conditions for all devices re-issues all previously aborted IO commands and resumes normal operation. In another implementation, if it is determined that the checkpoint message indicates that the system has not reached the power integrity checkpoint, then the PLPR module 112 determines whether the checkpoint message indicates that the system reached the storage integrity checkpoint. In one implementation, if it is determined that the system reached the storage integrity checkpoint, then the PLPR module 112 restores operating conditions of all the storage devices, reissue all previously aborted IO command, begins issuance of the new IO commands, writes unwritten data in main memory, which has not been written into the secondary memory up to the point the system loses power, unmounts all files systems, and reboots the system. The unwritten data includes but is not limited to all updated data in the main memory including execution states and user application data. In one example, an unmount operation may include logically detaching a file system from currently accessible files systems. In another implementation if it is determined that the system did not reach the storage integrity checkpoint, then the system is rebooted and all the unwritten data is lost.

Figure 2:
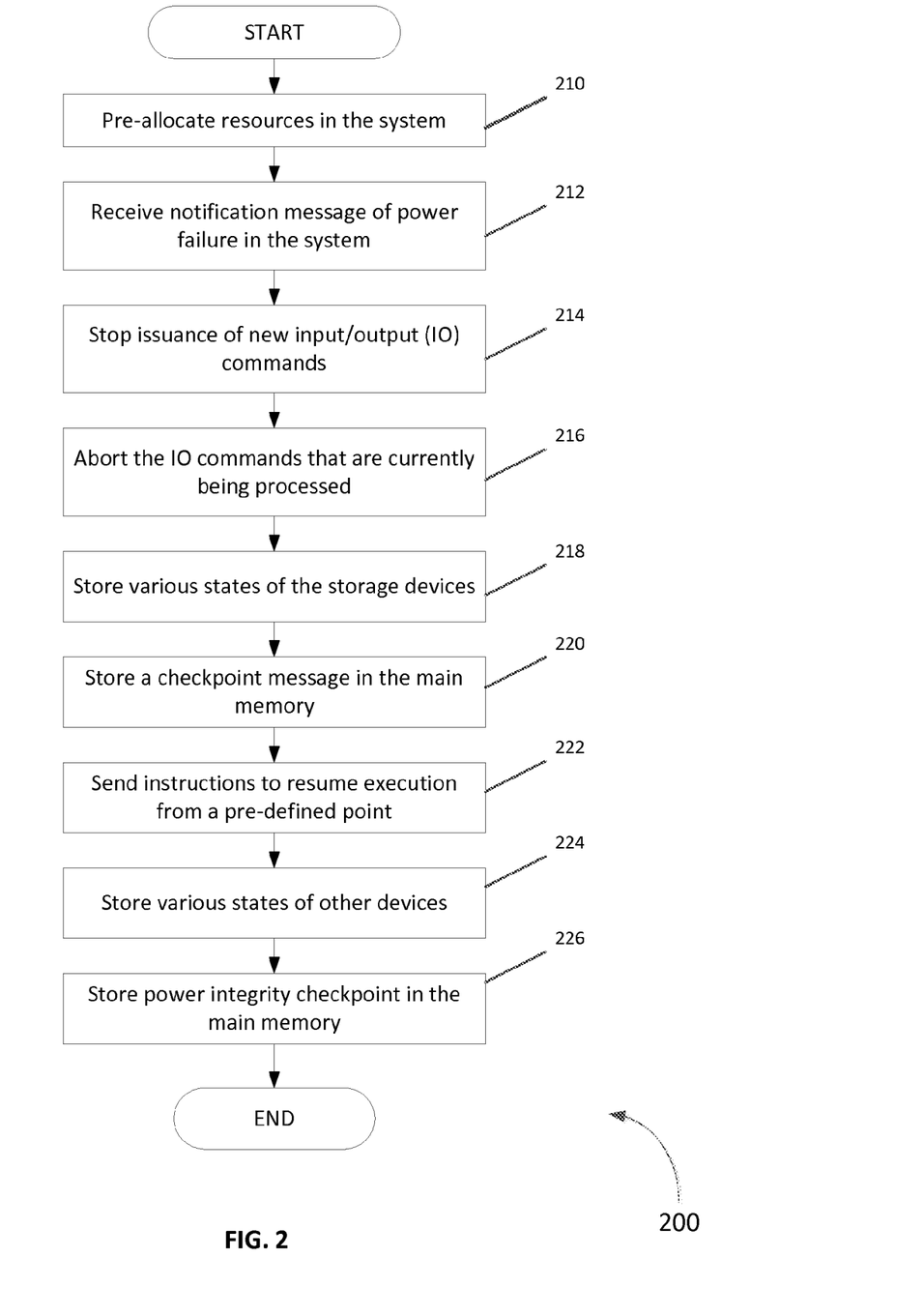
FIG. 2 is a flow diagram of one implementation of a method for providing non-volatile memory for suspend-to-RAM on power loss.

FIG. 2 is a flow diagram illustrating a method 200 for providing non-volatile memory for suspend-to-RAM on power loss according to an implementation of the disclosure. Method 200 may be performed by processing logic that may comprise hardware (e.g., circuitry, dedicated logic, programmable logic, microcode, etc.), software (such as instructions run on a processing device), firmware, or a combination thereof. In one implementation, method 200 is performed by the PLPR module 112 of FIG. 1 executing in a computing device, such as the computer system 100 of FIG. 1.

Method 200 begins at block 210 where the PLPR module 112 pre-allocates resources in the system. As discussed above, the resources are used to store sufficient state of the system in order to restore the system to the same conditions after power failure of the system as existed prior to power failure. In one implementation, the resources in the system 100 are part of the main memory 120. As discussed above, in some implementations, the resources are pre-allocated for each device while the device is being initialized during system boot. Also as discussed above, in other implementations, the resources are pre-allocated for each device while the device is being initialized, which occurs after the device has been connected to the computer system. At block 212, the notification message indicating the occurrence of the power failure in the system is received by the OS 104. Such notification may be provided by the firmware 124 in the hardware platform 106.

At block 214, the PLPR module 112 stops issuance of the new IO commands. At block 216, the PLPR module 112 aborts the IO commands, which are currently being processed by the storage devices. At block 218, the PLPR module 12 stores various states of the storage devices in order to restore the operating conditions of the storage devices. As discussed above, the states include, but are not limited to, device state, peripheral state, controller state and states of the buses (interconnects), which connects the controller to the computer system.

At block 220, the PLPR module 112 stores a checkpoint message, which indicates that the system 100 has reached a storage integrity checkpoint. As discussed above, the storage integrity checkpoint is a confirmation that the PLPR module 112 has reached an initial stage of handling of power loss. In one implementation, the initial stage of the handling of power loss includes completion of blocks 212, 214, 216 and 218. The PLPR module 112 stores the checkpoint message in a first pre-defined position in the main memory of the storage device 118. At block 222, the PLPR module 112 sends instructions to the firmware 124 to resume execution of the system from a pre-defined point. As discussed above, the pre-defined point may be a resume point, which would be the same point once the storage integrity checkpoint has been reached during power failure.

At block 224, the PLPR module 12 stores various states of the other devices in order to restore the operating conditions of the other devices. As discussed above, the other devices are not the storage devices. Also, as discussed above, the states include, but are not limited to, device state, peripheral state, controller state and states of the buses (interconnects), which connects the controller to the computer system.

At block 226, the PLPR module stores a power integrity checkpoint. As discussed above, the power integrity checkpoint is a confirmation that the PLPR module 112 has reached a completion stage of the handling of power loss. In one implementation, the completion stage of the handling of power loss includes completion of blocks 212, 214, 216, 218, 220 and 222. In one implementation, the PLPR module 112 stores the power integrity checkpoint in a second pre-defined position in the main memory of the storage device 118.

Figure 3:
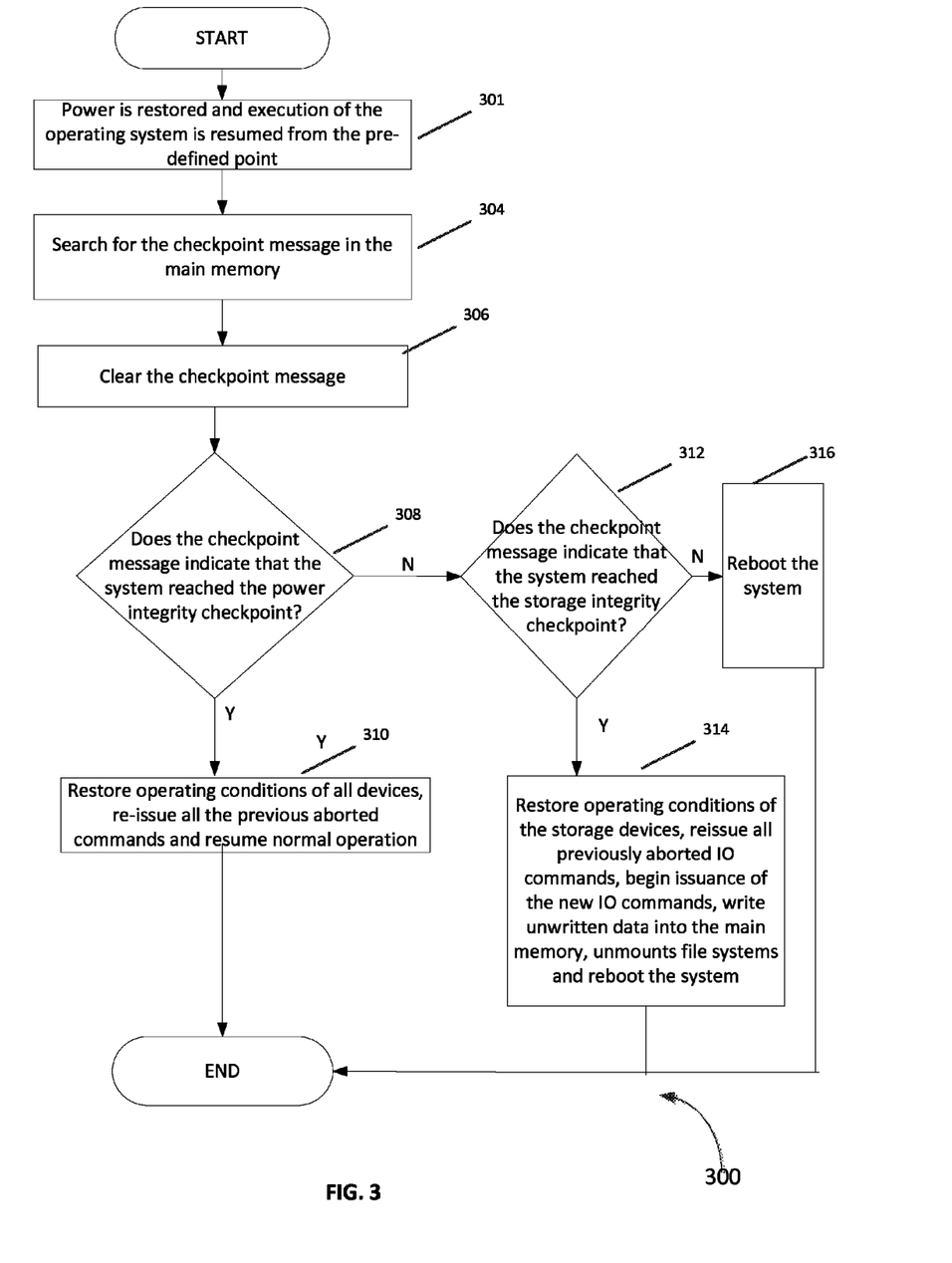
FIG. 3 is a flow diagram of another implementation of a method for providing non-volatile memory for suspend-to-RAM on power restoration.

FIG. 3 is a flow diagram of another implementation of a method for providing non-volatile memory for suspend-to-RAM on power restoration. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the PLPR module 112 of FIG. 1 executing in a computing device, such as the computer system 100 of FIG. 1.

At block 302, the power is restored and the firmware 124 resumes execution of the operating system from the pre-defined point. As discussed above, at block 222, the PLPR module 112 sends instructions to the firmware 124 to resume execution from a pre-defined point. Also discussed above, the pre-defined point may be a resume point, which would be the same point once the storage integrity checkpoint has been reached during power failure. At block 30 4, the PLPR module 112 searches the main memory for the checkpoint message As discussed above, the checkpoint message is stored in a first pre-defined position in the main memory. At block 306, the PLPR module 112 clears the checkpoint message in the main memory.

At block 308, the PLPR module 112 determines whether the checkpoint message indicates that the system has reached the power integrity checkpoint before losing power. As discussed above, the power integrity check point is a confirmation that the PLPR module 112 has reached the completion stage of the handling of power loss. Also, as discussed above, the completion stage may include completion of the initial stage and completion of the storage of the states of the other devices. If at block 308, it is determined that the system has reached the power integrity checkpoint before losing power then at block 310, the PLPR module 112 restores operating conditions of all devices, reissue all previous aborted commands and resumes normal operation.

If at block 308, it is determined that the system has not reached the power integrity checkpoint before losing power, then at block 312, the PLPR module determines whether the checkpoint message indicate that the system reached the storage integrity checkpoint. As discussed above, in one implementation, the storage integrity checkpoint is a confirmation that the PLPR module 112 has reached an initial stage of handling the power loss. The initial stage may include the PLPR module 112 stopping the issuance of new IOs and aborting the currently processing IOs, and storing the various states of the system 100 associated with the storage devices 118. If at block 312, the checkpoint indicates that the system reached the storage integrity checkpoint, then at block 314, the PLPR module 112 restores operating conditions for all storage devices 118, re-issues all previously aborted IO commands, begins issuance of the new IO commands, writes unwritten data into the main memory, which has not been written into the secondary memory up to the point the system loses power, unmounts all files systems, and reboots the system. If at block 312, the checkpoint indicates that the system has not reached the storage integrity checkpoint, then at block 316, the system reboots and all the unwritten data is lost.

Figure 4:
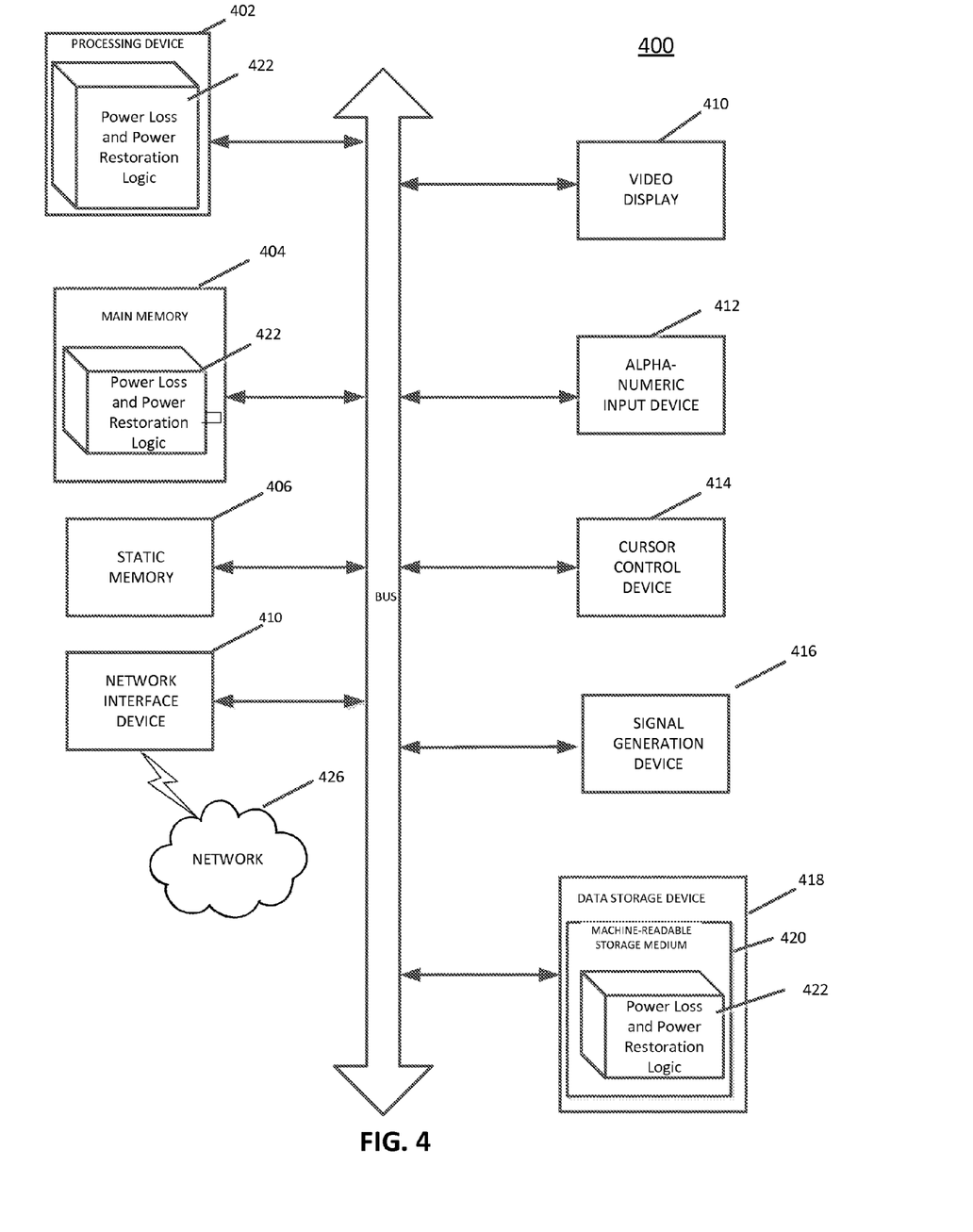
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute power-loss and power-restoration logic 422 for performing the operations and steps discussed herein. In one implementation, power-loss and power-restoration module 112 described with respect to FIG. 1 performs the power-loss and power-restoration logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. power-loss and power-restoration logic 422) embodying any one or more of the methodologies of functions described herein, such as methods 200 and 300 for providing non-volatile memory for suspend-to-RAM on power loss described with respect to FIG. 2 and FIG. 3. The power-loss and power-restoration logic 422 may also reside, completely or at least partially, within the memory 406 and/or within the processing device 402 during execution thereof by the computer system 400; the memory 406 and the processing device 402 also constituting machine-accessible storage media.

The machine-readable storage medium 420 may also be used to store the power-loss and power-restoration processing logic 422 persistently containing methods that call the above applications. While the machine-readable storage medium 420 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "restoring", "executing", "allocating", "receiving", 'storing', "searching", "providing", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other implementations will be apparent to those well-known in the art upon reading and understanding the above description. Although the disclosure has been described with reference to specific examples of implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    searching, by a processing device, for a checkpoint message in a memory upon receipt of notification of restoring of power in a system, wherein the checkpoint message comprises confirmation of storing of a state of a storage device prior to a loss of the power in the system;
    determining, by the processing device, whether the checkpoint message indicates that the system reached a power integrity checkpoint prior to the loss of the power in the system, wherein the power integrity checkpoint is a confirmation of storing of a state of another device prior to the loss of the power in the system, wherein the other device is different from the storage device;
    restoring operating conditions of the system when it is determined that the system has reached the power integrity checkpoint; and
    determining whether the system reached a storage integrity checkpoint when the checkpoint message indicates that the system has not reached the power integrity checkpoint.

2. The method of claim 1 wherein the memory comprises a main memory and a secondary memory, wherein the checkpoint message and the power integrity checkpoint are stored in the main memory.

3. The method of claim 1 wherein restoring operating conditions of system comprises restoring operating conditions of the storage device and the other device, reissuing previously aborted commands and resuming normal operation.

4. The method of claim 1 wherein the storage integrity checkpoint comprises a stop of issuance of new input/output (IO) commands, an abort of IO commands being processed at a time of the power loss, storing various states of the system associated with the storage device and combinations thereof.

5. The method of claim 1 further comprising restoring operating conditions of the storage device, re-issuing previously aborted IO commands, beginning issuance of new IO commands, writing unwritten data into the memory, unmounting file systems, rebooting the system, and combinations thereof when it is determined that the system reached the storage integrity checkpoint.

6. The method of claim 1 further comprising sending instructions to resume execution from a pre-defined point upon the restoration of the power in the system, wherein the pre-defined point is a point where the storage integrity checkpoint has been reached during the power loss in the system.

7. A system comprising:
    a memory; and
    a processing device coupled to the memory, the processing device to:
        search for a checkpoint message in the memory upon receipt of notification of restoring of power in a system, wherein the checkpoint message comprises confirmation of storing of a state of a storage device prior to a loss of the power in the system;
        determine whether the checkpoint message indicates that the system reached a power integrity checkpoint prior to the loss of the power in the system, wherein the power integrity checkpoint is a confirmation of storing of a state of another device prior to the loss of the power in the system, wherein the other device is different from the storage device;
        restore operating conditions of the system when it is determined that the system has reached the power integrity checkpoint; and determine whether the system reached a storage integrity checkpoint when the checkpoint message indicates that the system has not reached the power integrity checkpoint.

8. The system of claim 7 wherein the memory comprises a main memory and a secondary memory, wherein the checkpoint message and the power integrity checkpoint are stored in the main memory.

9. The system of claim 7 wherein to restore operating conditions of the system, the processing device is to restore operating conditions of the storage device and the other device, reissue previously aborted commands, and resume normal operation.

10. The system of claim 7 wherein the storage integrity checkpoint comprises a stop of issuance of new input/output (IO) commands, an abort of IO commands being processed at a time of the power loss, storing various states of the system associated with the storage device and combinations thereof.

11. The system of claim 7 wherein the processing device restores operating conditions of the storage device, re-issues previously aborted IO commands, begins issuance of new IO commands, writes unwritten data into the memory, unmounts file systems, reboots the system, and combinations thereof when it is determined that the system reached the storage integrity checkpoint.

12. The system of claim 7 wherein the processing device sends instructions to resume execution from a pre-defined point upon the restoration of the power in the system, wherein the pre-defined point is a point where the storage integrity checkpoint has been reached during the power loss in the system.

13. A non-transitory machine-readable storage medium comprising instructions that, when accessed by a processing device, cause the processing device to:
search, by the processing device, for a checkpoint message in a memory upon receipt of notification of restoring of power in a system, wherein the checkpoint message comprises confirmation of storing of a state of a storage device prior to a loss of the power in the system;
determine, by the processing device, whether the checkpoint message indicates that the system reached a power integrity checkpoint prior to the loss of the power in the system, wherein the power integrity checkpoint is a confirmation of storing of a state of another device prior to the loss of the power in the system, wherein the other device is different from the storage device;
restore operating conditions of the system when it is determined that the system has reached the power integrity checkpoint; and
determine whether the system reached a storage integrity checkpoint when the checkpoint message indicates that the system has not reached the power integrity checkpoint.

14. The non-transitory machine-readable storage medium of claim 13 wherein the memory comprises a main memory and a secondary memory, wherein the checkpoint message and the power integrity checkpoint are stored in the main memory.

15. The non-transitory machine-readable storage medium of claim 13 wherein to restore operating conditions of the system, the processing device is to restore operating conditions of the storage device and the other device, reissue previously aborted commands and resume normal operation.

16. The non-transitory machine-readable storage medium of claim 13 wherein the storage integrity checkpoint comprises a stop of issuance of new input/output (IO) commands, an abort of IO commands being processed at a time of the power loss, storing various states of the system associated with the storage device, and combinations thereof.

17. The non-transitory machine-readable storage medium of claim 13 wherein the processing device is further to restore operating conditions of the storage device, reissue previously aborted IO commands, begin issuance of new IO commands, write unwritten data into the memory, unmount file systems, reboot the system, and combinations thereof when it is determined that the system reached the storage integrity checkpoint.

18. The non-transitory machine-readable storage medium of claim 13 wherein the processing device is further to send instructions to resume execution from a pre-defined point upon the restoration of the power in the system, wherein the pre-defined point is a point where the storage integrity checkpoint has been reached during the power loss in the system.

* * * * *